United States Patent
Hsuan et al.

(10) Patent No.: US 9,250,436 B2
(45) Date of Patent: Feb. 2, 2016

(54) TRANSPARENCY ADJUSTING APPARATUS AND DISPLAY DEVICE HAVING THE SAME

(71) Applicant: International Business Machines Corporation, Armonk, NY (US)

(72) Inventors: Wei-Yi Hsuan, Taipei (TW); Yi-Sheng Lee, Chung-Ho (TW)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 13/622,352

(22) Filed: Sep. 18, 2012

(65) Prior Publication Data

US 2013/0083401 A1    Apr. 4, 2013

(30) Foreign Application Priority Data

Sep. 30, 2011    (TW) .............................. 100135510 A

(51) Int. Cl.
G02B 26/00    (2006.01)
G02F 1/01    (2006.01)
G02F 1/1335    (2006.01)
G02B 5/02    (2006.01)

(52) U.S. Cl.
CPC ............ *G02B 26/004* (2013.01); *G02B 5/0294* (2013.01); *G02B 26/00* (2013.01); *G02F 1/0147* (2013.01); *G02F 1/133504* (2013.01); *G02B 5/0278* (2013.01); *G02F 2201/38* (2013.01); *G02F 2201/58* (2013.01); *G02F 2203/03* (2013.01); *G02F 2203/62* (2013.01)

(58) Field of Classification Search
CPC ..... G02F 1/01–1/01725; G02B 26/00–26/129; G02B 1/06; G02B 7/1815; H05B 3/84
USPC ................. 359/227–228, 240–244, 276–277, 359/288–289, 507–514, 599, 609, 615, 839, 359/845, 885–886, 893; 348/744, 748–749, 348/764–765, 770, 773–775, 786; 349/20–21, 104–111; 353/52, 55, 97; 362/6, 318; 250/201.1, 204, 205, 215
See application file for complete search history.

(56) References Cited

U.S. PATENT DOCUMENTS

| 4,370,837 | A | * | 2/1983 | Larguia | E06B 6/6722 |
| | | | | | 359/228 |
| 4,536,061 | A | * | 8/1985 | Nishimura | G02F 1/0147 |
| | | | | | 359/242 |
| 4,589,730 | A | * | 5/1986 | Obu | G02F 1/17 |
| | | | | | 359/228 |
| 5,231,530 | A | * | 7/1993 | Yen | G02B 26/004 |
| | | | | | 359/228 |
| 5,694,144 | A | * | 12/1997 | Lefrou | G02F 1/163 |
| | | | | | 345/105 |
| 6,001,487 | A | * | 12/1999 | Ladang | B32B 17/10045 |
| | | | | | 428/344 |
| 2006/0262374 | A1 | | 11/2006 | Chahroudi | |
| 2008/0092456 | A1 | | 4/2008 | Millett et al. | |
| 2011/0047869 | A1 | * | 3/2011 | Griessen | A01G 9/243 |
| | | | | | 47/17 |
| 2012/0057243 | A1 | * | 3/2012 | Koga | G02B 3/14 |
| | | | | | 359/665 |

FOREIGN PATENT DOCUMENTS

| CN | 101802679 | 8/2010 |
| JP | 2008139632 | 6/2008 |
| TW | 200704515 | 2/2007 |
| TW | 200808541 | 2/2008 |
| WO | WO2011099499 | 8/2011 |

\* cited by examiner

*Primary Examiner* — Stephone B Allen
*Assistant Examiner* — Jeffrey Madonna
(74) *Attorney, Agent, or Firm* — Steven M. Greenberg, Esq.; CRGO Law

(57) ABSTRACT

A transparency adjusting apparatus is provided. The transparency adjusting apparatus includes: a first transparent shell; a heater disposed on the first transparent shell; and a second transparent shell disposed on the first transparent shell, wherein the first transparent shell and the second transparent shell are sealed to define a sealed space for containing a working fluid therein and the working fluid absorbs heat from the heater and evaporates to condense on the second transparent shell, thereby adjusting the transparency of the second transparent shell.

15 Claims, 7 Drawing Sheets

TRANSPARENCY ADJUSTING APPARATUS AND DISPLAY DEVICE HAVING THE SAME

CROSS REFERENCE TO RELATED APPLICATIONS

This application claims the right of priority based on Taiwan Patent Application No. 100135510 entitled "TRANSPARENCY ADJUSTING APPARATUS AND DISPLAY DEVICE HAVING THE SAME", filed on Sep. 30, 2011, which is incorporated herein with reference and assigned to the assignee herein.

FIELD OF THE INVENTION

The present invention relates to display devices, and more particularly, to an anti-reflection anti-glare transparency adjusting apparatus and a display device having the same.

BACKGROUND OF THE INVENTION

Due to the increasing demand for the human-machine interfaces for use with various electronic products, especially the rapid development of numerous handheld touch-controlled devices, the application of display devices is becoming wider. A display device (such as a liquid crystal display device) is typically equipped with a cover glass for functioning as a display window and covering the display device.

In this regard, an important research topic is about reduction of mirror reflection that originates from various display device surfaces. It is because, when operating in an environment of a high light intensity (for example, outdoors or in the presence of a strong light source), most electronic products are affected by reflection overwhelmingly, and thus the quality of image display of display devices are compromised.

There are plenty of conventional methods of reducing the aforesaid minor reflection. For example, the cover glass of a display device is coated with an anti-reflection film, and its anti-reflection performance is enhanced by adjusting its thickness and refractive index. However, a touch control process performed on the display device entails touching the surface of the anti-reflection film with a finger frequently, and in consequence the anti-reflection film undergoes wear and tear and even peels off to the detriment of its anti-reflection effect.

Another conventional method involves coarsening the cover glass surface by an etching process in order to turn the cover glass surface into an anti-glare surface. During the etching process, the cover glass surface is exposed to a specific chemical whereby the cover glass surface is coarsened to a certain extent so as to scatter visible light. However, this method achieves its goal at the cost of reducing the transparency of the cover glass greatly and using a corrosive acidic solution during the etching process to the detriment of environmental protection.

SUMMARY OF THE INVENTION

In an embodiment of the present invention, a transparency adjusting apparatus comprises: a first transparent shell; a heater disposed on the first transparent shell; and a second transparent shell disposed on the first transparent shell; wherein the first transparent shell and the second transparent shell are sealed to define a sealed space for containing a working fluid therein and the working fluid absorbs heat from the heater and evaporates to condense on the second transparent shell, thereby adjusting the transparency of the second transparent shell.

The transparency adjusting apparatus further comprises a transparency detector. The transparency detector comprises a light emitter and a light receiver. The light emitter emits a light beam that passes through the first transparent shell and the second transparent shell before being received by the light receiver, so as to obtain data pertaining to the transparency of the first transparent shell and the second transparent shell. The transparency adjusting apparatus further comprises a control circuit electrically connected to the light emitter, the light receiver, and the heater. The control circuit receives the data pertaining to the transparency of the first transparent shell and the second transparent shell and sends the data to the heater, so as to control the saturation pressure and boiling point of the working fluid.

In response to the starting of the heater to heat up the sealed space, the saturation pressure and the boiling point of the working liquid rising to condense vapor of the working liquid, thereby forming a condensed layer and reducing the transparency of the second transparent shell.

In another embodiment of the present invention, a display device comprises: a display panel; a first transparent shell disposed in front of the display panel; a heater disposed on the first transparent shell; and a second transparent shell disposed on the first transparent shell; wherein the first transparent shell and the second transparent shell are sealed to define a sealed space for containing a working fluid therein and the working fluid absorbs heat from the heater and evaporates to condense on the second transparent shell, thereby adjusting the transparency of the second transparent shell.

In yet another embodiment of the present invention, a transparency adjusting apparatus for a display device or kits thereof, configured as being disposed in front of a display surface of the display device or kits thereof, comprising: a first transparent shell body comprising a first transparent shell portion and a second transparent shell portion; and a heater disposed on the first transparent shell portion; wherein the first transparent shell portion and the second transparent shell portion together define a sealed space for containing a working fluid therein and the working fluid absorbs heat from the heater and evaporates to condense on the second transparent shell portion, thereby adjusting the transparency of the second transparent shell portion.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
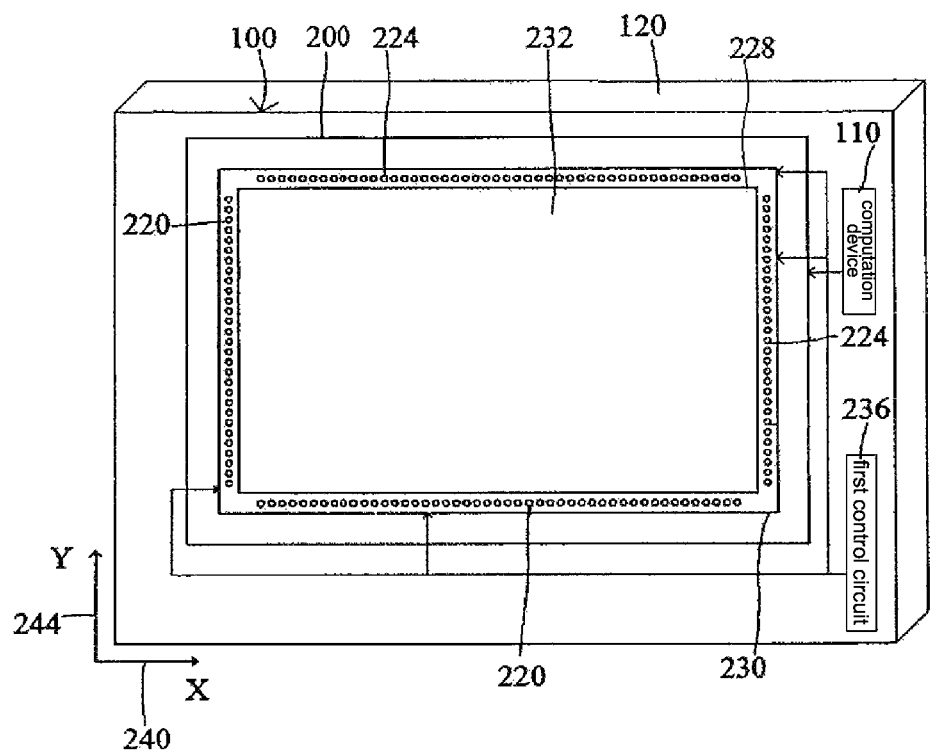
FIG. 1 is a schematic view of a display device according to a preferred embodiment of the present invention.

Referring to FIG. 1, there is shown a schematic view of a display device 100 according to a preferred embodiment of the present invention. As shown in FIG. 1, the display device 100 comprises a display panel 200. For example, the display panel 200 is a touch panel. For example, the touch panel is an infrared touch panel. In practice, the touch panel comes in different forms, including a resistive touch panel, a capacitive touch panel, and a surface acoustic wave (SAW) touch panel, but the present invention is not limited thereto. The display device 100 comprises the infrared touch panel 200, a computation device 110, and a device casing 120. As shown in FIG. 1, the lid of the device casing 120 of the display device 100 is removed, and thus a user can watch the elements, such as an infrared emitter 220 and an infrared receiver 224, beneath the lid which is otherwise in place. The infrared touch panel 200 of the display device 100 comprises a rectangular liquid crystal display device module 228 and a rectangular infrared frame 230 disposed on the liquid crystal display device module 228. A rectangular position-detecting surface 232 is defined on the liquid crystal display device module 228. The position-detecting surface 232 is substantially aligned with an internal region defined by the infrared frame 230. Two said infrared emitters 220 are disposed on two adjoined sides (such as the lower side and the left side) of the infrared frame 230, respectively. Two said infrared receivers 224 are disposed on two other adjoined sides (such as the upper side and the right side) of the infrared frame 230, respectively.

The infrared touch panel 200 further comprises a first control circuit 236. The purpose of the first control circuit 236 is to allow the infrared emitters 220 to emit light beams in sequence, that is, from left to right, and from top to bottom, and allow the infrared receivers 224 to receive the light beams, respectively. Due to the aforesaid arrangement, the infrared emitters 220 scan the position-detecting surface 232 in sequence, thereby forming thereon a latticed infrared light beam matrix. The aforesaid elements constitute part of the conventional infrared touch panel and are not described in detail herein for the sake of brevity.

When an object is placed at a position of the position-detecting surface 232, the object blocks a light path corresponding in position to the position. As a result, the light beams emitted from the infrared emitters 220 are prevented from being received by the infrared receivers 224. Hence, the first control circuit 236 determines the x-coordinate of the object along X-axis 240 and the y-coordinate of the object along Y-axis 244 according to whether the infrared receivers 224 detect the light beams.

Figure 2:
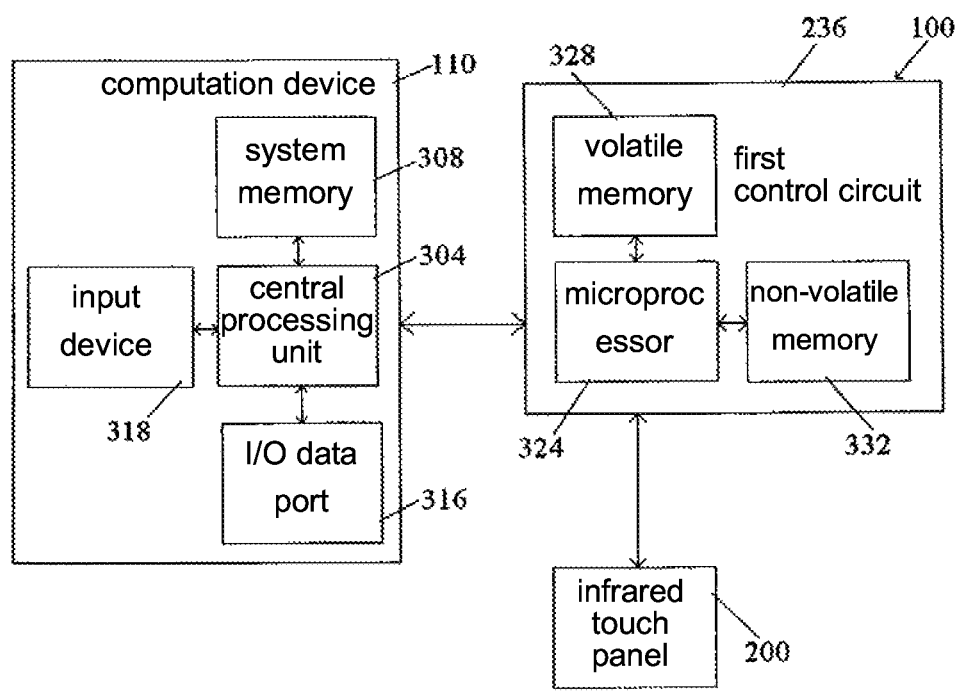
FIG. 2 is a block diagram of the display device of FIG. 1.

Referring to FIG. 2, there is shown a block diagram of the display device 100 of FIG. 1. The display device 100 comprises the computation device 110, the infrared touch panel 200, and the first control circuit 236. In a preferred embodiment of the present invention, the computation device 110 is a computer. The computation device 110 comprises a central processing unit (CPU) 304, a system memory 308, and one or more I/O data ports 316. In a preferred embodiment, the first control circuit 236 comprises a microprocessor 324, a volatile memory (such as SRAM) 328, and a non-volatile memory (such as flash memory) 332. The display device 100 further comprises an input device 318 (such as a keyboard) and a loudspeaker (not shown). The central processing unit (CPU) 304 communicates with the system memory 308 through an address/data bus (not shown). The microprocessor 324 can be any commercially available or custom-made microprocessor. The system memory 308 includes, but is not limited to, one of SRAM, DRAM, ROM, PROM, EPROM, EEPROM, and flash memory. The aforesaid components can be conventional components, like the components of a conventional data processing system, and are configured to operate in a way described herein according to the present invention.

The system memory 308 further comprises a plurality of software and data for use in the computation device 110, namely an operating system (not shown); an application (not shown); an input/output (I/O) device driver (not shown); and data (not shown). The I/O device driver typically comprises a software routine whereby the I/O device driver communicates with the I/O data ports 316, a data storage device (not shown), and the system memory 308. The application executes programs for performing various functions of the computation device 110. The data include dynamic and static data for use in displaying the application, operating system, I/O device driver and other software programs stored in memory, and a portion of the data can be displayed by the liquid crystal display device module 228. The aforesaid components/programs can be conventional components/programs, like plenty of conventional components/programs used in a data processing system, and can be configured to operate in a manner described herein according to the present invention. The infrared touch panel 200 is a conventional infrared touch panel. Since its liquid crystal screen does not generate light, it is necessary to display the liquid crystal screen by means of a backlight source. The liquid crystal display device module 228 of the infrared touch panel 200 comprises a backlight source, a light-guiding plate, a polarizing plate, liquid crystal, color film, and a polarizing plate. After the backlight source has emitted light, the light is dispersed evenly by the light-guiding plate before passing through the polarizing plate, the liquid crystal, the color film, and the polarizing plate to fall on the liquid crystal screen. The aforesaid components are part of a conventional panel and thus are not described in detail herein for the sake of brevity.

A point to note is that the display panel 200 is not limited to the infrared touch panel shown in FIG. 1 and FIG. 2. In practice, the display panel 200 can come in different forms, such as a touch panel, a non-touch panel, a monitor, and a television, but the present invention is not limited thereto.

The infrared touch panel 200 further comprises a transparency adjusting apparatus 620 (see FIG. 3) for adjusting the display transparency of the infrared touch panel 200, and providing a solution for solving problems facing the prior art, such as reflection and glare.

Figure 3:
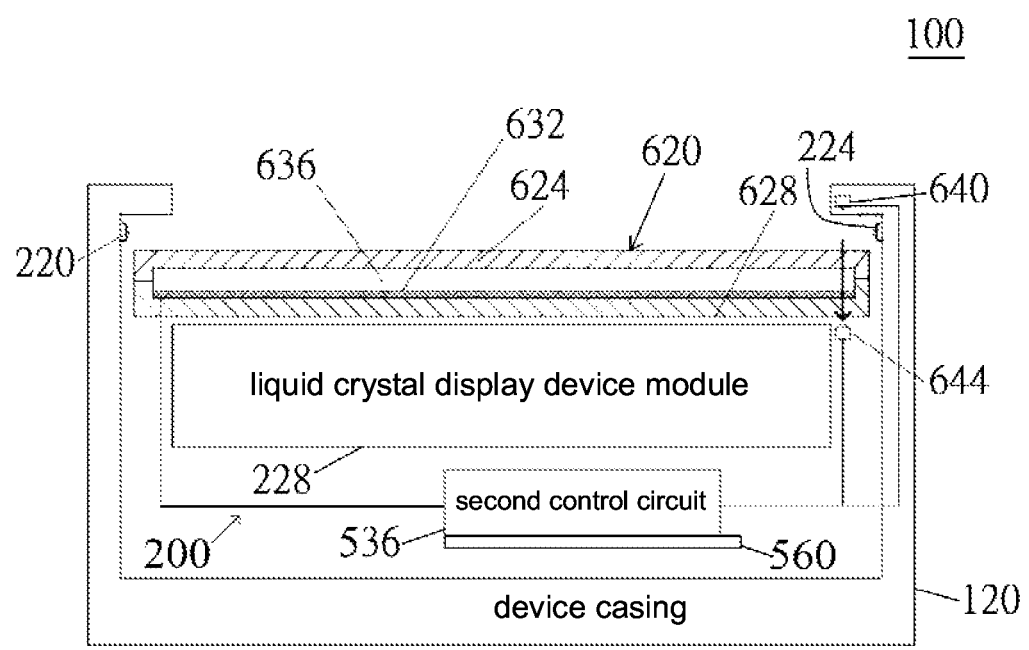
FIG. 3 is a cross-sectional view of a display device according to a preferred embodiment of the present invention.

Referring to FIG. 3, there is shown a cross-sectional view of the display device 100 of FIG. 1, the infrared touch panel 200, the transparency adjusting apparatus 620, and the device casing 120. Referring to FIG. 1 through FIG. 3, the infrared touch panel 200 comprises the liquid crystal display device module 228, the infrared emitters 220, and the infrared receivers 224. The infrared emitters 220 emit infrared light. The infrared receivers 224 receive the infrared light and undergo light communication with the infrared receivers 224. The infrared emitters 220 and the infrared receivers 224 form an infrared matrix in a conventional manner, so as to perform touch sensing, wherein its infrared emission direction and infrared reception direction are substantially parallel to the position-detecting surface 232 of the infrared touch panel 200.

The first control circuit 236 (see FIG. 1) receives and controls signals of the infrared emitters 220 and the infrared receivers 224 by means of a conventional circuit. A circuit board 560 is disposed at the bottom of a rear surface of the liquid crystal display device module 228 and adapted to carry the first control circuit 236.

The infrared touch panel 200 comprises a connection circuit (not shown) for connecting the infrared emitters 220, the infrared receivers 224, and the first control circuit 236 according to related prior art. The connection circuit is similar to a connection circuit and is formed by an indium tin oxide (ITO) process in wide use. The ITO process typically comprises the steps of: forming an indium tin oxide layer on the touch screen panel 228; and patterning the indium tin oxide layer to form the connection circuit. However, the connection circuit can also be formed by any other conventional techniques, and thus the present invention is not restrictive thereof.

FIG. 3 also shows how the liquid crystal display device module 228 and the transparency adjusting apparatus 620 are arranged inside the device casing 120. In an embodiment, the transparency adjusting apparatus 620 is a vapor chamber which has vapor received therein and confined thereto and is disposed above the liquid crystal display device module 228. The transparency adjusting apparatus 620 is substantially rectangular and corresponds in shape to the liquid crystal display device module 228. The vapor chamber 620 comprises a first transparent shell 628 and a second transparent shell 624 disposed on and covering the first transparent shell 628. The first transparent shell 628 and the second transparent shell 624 together define a sealed space 636. The second transparent shell 624 and the first transparent shell 628 are made of a transparent material, such as glass, transparent thermosetting resins, and plastics. The first transparent shell 628 and the second transparent shell 624 are panel-shaped with a thickness of 0.5 mm to 2 mm, but the present invention is not limited thereto. A means of coupling the second transparent shell 624 and the first transparent shell 628 together includes, but is not limited to, adhesion, fastening, and heat sealing. The second transparent shell 624 and the first transparent shell 628 can also be integrally formed as a unitary structure to form a transparent vapor chamber body, but the present invention is not limited thereto. The vapor chamber 620 further comprises a heater 632 that includes, but is not limited to, a coil heater and a resistive heater. The heater 632 and the first transparent shell 628 are fixed to each other by being coupled together with a fastener or glued together. The details and purposes of the aforesaid components are described and explained in detail later.

In an embodiment, the heater 632 is formed on the first transparent shell 628, whereas the first transparent shell 628 and the second transparent shell 624 are arranged in a manner to face each other and sealed hermetically to form the sealed space 636. Afterward, the sealed space 636 is vacuumed to an absolute pressure approximating zero, and then a liquid (that includes, but is not limited to, water, alcohol, ammonia, and cryogen) is contained in the sealed space 636 of the vapor chamber 620 in a vacuum state. By controlling the quantity of the liquid, it is feasible that the boiling point of the liquid is kept in a specific range. In an embodiment where the liquid is water, the boiling point of water ranges between −50° C. and 40° C., and preferably between −30° C. and 20° C.

FIG. 3 also shows that a light emitter 640 (such as an emitting LED) and a light receiver 644 (such as an receiving LED) are disposed on the two sides of the transparency adjusting apparatus 620, electrically connected in the form of a closed loop, and are electrically connected to a second control circuit 536. The second control circuit 536 can be a conventional circuit and is manufactured in the same way as the first control circuit 236, but the present invention is not limited thereto. The second control circuit 536 receives signals from the emitting LED 640 and the receiving LED 644 and controls the signals thus received. The second control circuit 536 is disposed on the circuit board 560 (disposed at the bottom of the rear surface of the liquid crystal display device module 228). The details and purposes of the aforesaid components are described in detail later. The first control circuit 236 and the second control circuit 536 are separate. Alternatively, the first control circuit 236 and the second control circuit 536 are integrated to form a single circuit.

Figure 4:
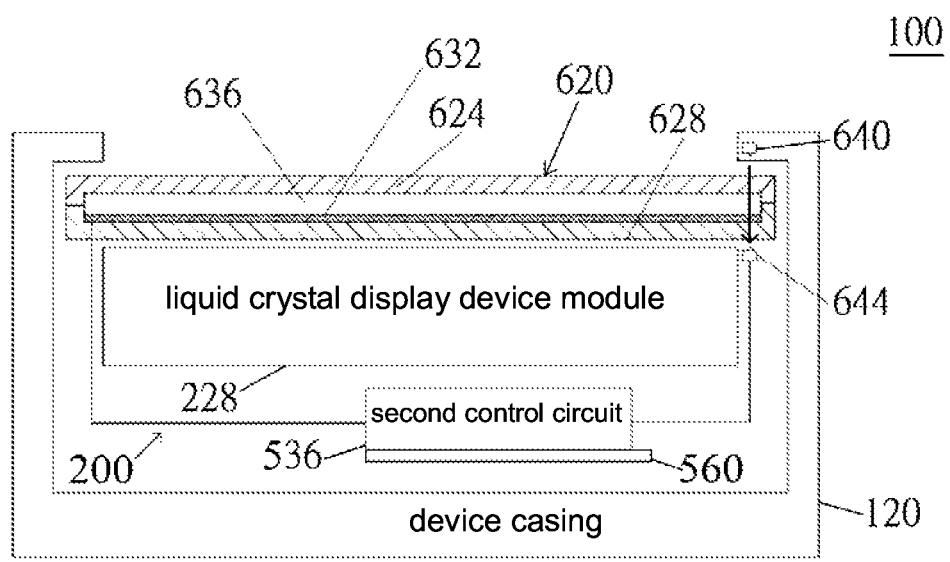
FIG. 4 is a cross-sectional view of a display device according to another preferred embodiment of the present invention.

Referring to FIG. 4, there is shown a cross-sectional view of the display device 100 according to another preferred embodiment of the present invention. As shown in FIG. 4, the display panel 200 of the display device 100 is a non-touch panel. For example, the non-touch panel comes in various forms, but the present invention is not limited thereto.

Figure 5:
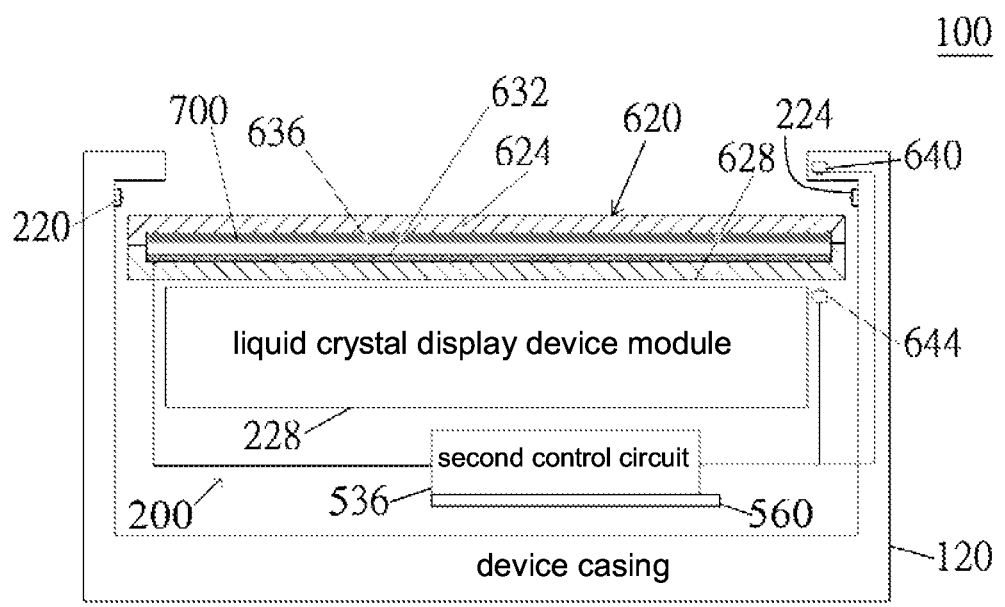
FIG. 5 is a schematic view of the operation of a transparency adjusting apparatus for a display device according to another preferred embodiment of the present invention.

Referring to FIG. 5, there is shown a schematic view of the operation of the transparency adjusting apparatus 620 of the display device 100 (see FIG. 3), such as the operation of a vapor chamber, according to another preferred embodiment of the present invention. Referring to FIG. 3 and FIG. 5, the display panel 200 of the display device 100 is an infrared touch panel. The vapor chamber 620 is manufactured in the way described above. The boiling point of the water in the vapor chamber 620 ranges between −50° C. and 40° C., preferably between −30° C. and 20° C., or is −10° C., for example. At room temperature, such as 25° C., the vapor chamber 620 is filled with transparent water vapor, and thus the vapor chamber 620 is transparent, thereby permitting the free passage of light.

After the vapor chamber 620 manufactured in the way described above has been installed on the display device 100, adjustment of the transparency of the vapor chamber 620 requires starting the heater 632 to heat the sealed space 636 defined by the vapor chamber 620; as a result, not only does the saturation pressure of the water vapor in the vapor chamber 620 increase, but the boiling point of water at room temperature also increases (such as 40° C.), and in consequence vapor condenses on the second transparent shell 624 to form a condensed layer 700. The condensed layer 700 reduces the transparency of the second transparent shell 624 in a variable manner.

Referring to FIG. 5, a light emitter 640, a light receiver 644, and the second control circuit 536 operate in conjunction with each other by a common conventional technique so as to measure the transparency of the vapor chamber 620 and send transparency-related data to the first control circuit 236. The first control circuit 236 gives feedback to the heater 632 and thereby controls the saturation pressure of the vapor chamber 620. Therefore, the transparency of the vapor chamber 620 is controlled effectively and precisely.

Figure 6:
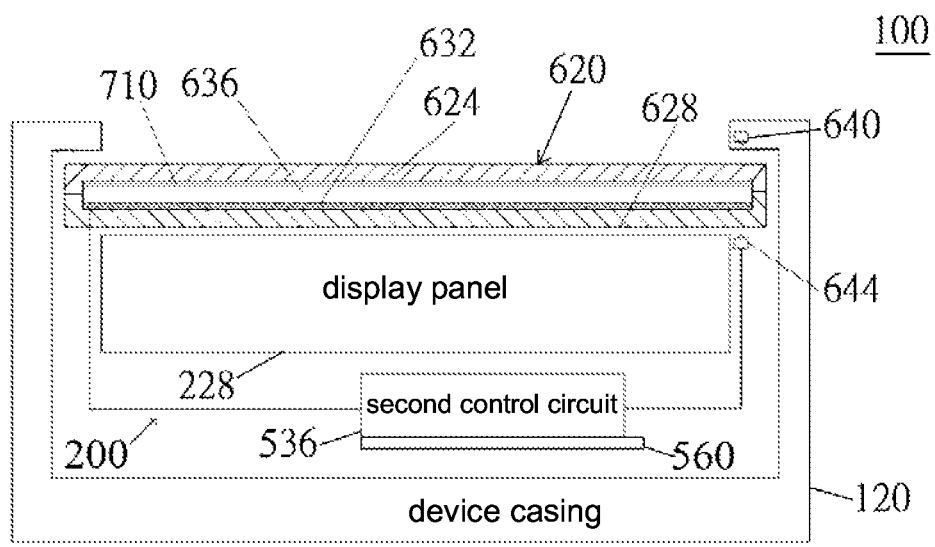
FIG. 6 is a schematic view of the operation of a transparency adjusting apparatus for a display device according to yet another preferred embodiment of the present invention.

Referring to FIG. 6, there is shown a schematic view of the operation of the transparency adjusting apparatus 620 for the display device 100 (see FIG. 4), such as the operation of a vapor chamber, according to yet another preferred embodiment of the present invention. Referring to FIG. 4 and FIG. 6, the display panel 200 of the display device 100 is a non-touch panel, wherein vapor condenses on the second transparent shell 624 to form a condensed layer 710. The condensed layer 710 reduces the transparency of the second transparent shell 624 in a variable manner.

Figure 7:
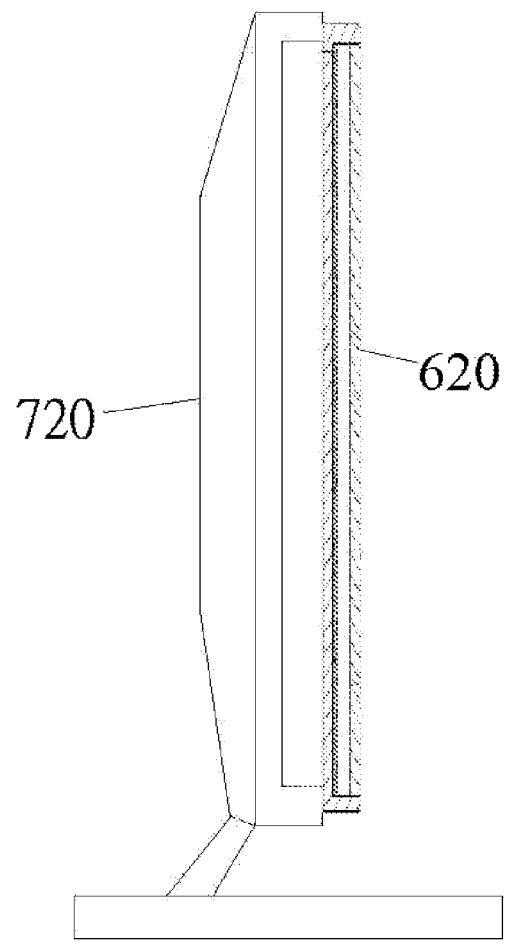
FIG. 7 is a schematic view of a self-contained transparency adjusting apparatus disposed at a display device according to a further preferred embodiment of the present invention.

Referring to FIG. 7, there is shown a schematic view of the transparency adjusting apparatus 620 provided in the form of a self-contained device according to a further preferred embodiment of the present invention. As shown in FIG. 7, the transparency adjusting apparatus 620 is directly coupled to the screen of a display device 720. Alternatively, the top end of the transparency adjusting apparatus 620 is coupled to a strip (not shown) with a hook (not shown), wherein the hook is fastened to a hole (not shown) behind the screen. Alternatively, the transparency adjusting apparatus 620 is coupled to, and is confined to, the screen of the display device 720 by a frame (not shown), thereby effectuating transparency adjustment. The transparency adjusting apparatus 620 further comprises a universal serial bus (USB). The transparency adjusting apparatus 620 is connected to the display device 720 via the universal serial bus (USB) by a conventional technique, so as to achieve transparency adjustment. The universal serial bus (USB) is part of the related prior art and thus is not described in detail herein for the sake of brevity.

Due to its aforesaid design, the present invention achieves an anti-reflection anti-glare effect, features a simple manufacturing process, adjusts the transparency of a display device surface precisely, and reduces its etching/coating process significantly, thereby providing an environmentally friendly solution.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A transparency adjusting apparatus, comprising:
   a first transparent shell;
   a heater disposed on the first transparent shell; and
   a second transparent shell disposed on the first transparent shell;
   wherein the first transparent shell and the second transparent shell are sealed to define a sealed space for containing a working fluid therein and the working fluid absorbs heat from the heater and evaporates to condense on the second transparent shell, thereby adjusting the transparency of the second transparent shell.

2. The transparency adjusting apparatus as claimed in claim 1, further comprising a transparency detector for detection of the transparency of the first transparent shell and the second transparent shell.

3. The transparency adjusting apparatus as claimed in claim 2, wherein the transparency detector comprises a light emitter and a light receiver, wherein a light beam emitted from the light emitter, through the first transparent shell and the second transparent shell, and received by light receiver, thereby acquiring data pertinent to the transparency of the first transparent shell and the second transparent shell.

4. The transparency adjusting apparatus as claimed in claim 3, further comprising a control circuit connecting to the light emitter, the light receiver and the heater, the control circuit served as receiving data pertinent to the transparency of the first transparent shell and the second transparent shell and transmitting the data to the heater, thereby providing feedback control of a saturation pressure and a boiling point of working liquid.

5. The transparency adjusting apparatus as claimed in claim 4, wherein in response to starting the heater to heat up the sealed space, the saturation pressure and the boiling point of the working liquid rising to allow vapor of the working liquid to condense on the second transparent shell and thereby form a condensed layer and reduce the transparency of the second transparent shell.

6. The transparency adjusting apparatus as claimed in claim 1, wherein the transparency adjusting apparatus is formed comprising of the following steps:
   configuring the heater on the first transparent shell;
   disposing the first transparent shell opposing to the second transparent shell and sealing them to define a sealed space therebetween;
   vacuuming the sealed space; and
   sealing the working liquid within the sealed space in a vacuum state.

7. The transparency adjusting apparatus as claimed in claim 1, wherein the working liquid is one selected from a group consisting of water, alcohol, ammonia, and cryogen; wherein the first transparent shell and the second transparent shell are made of a transparent material selected from a group consisting of glass, transparent thermosetting resins, and plastics; and wherein the first transparent shell and the second transparent shell are respectively a plate in shape; or wherein combination of the first transparent shell and the second transparent shell is selected from a group consisting of monocoque, adhesion, fastening, and heat sealing.

8. The transparency adjusting apparatus as claimed in claim 1, wherein the transparency adjusting apparatus is suitable for a display device to adjust transparency of a display surface of the display device.

9. The transparency adjusting apparatus as claimed in claim 8, wherein the display device comprises a display panel; or wherein the display panel comprises a touch display panel or a non-touch display panel.

10. The transparency adjusting apparatus as claimed in claim 8, wherein the transparency adjusting apparatus is directly coupled to the display device; wherein the transparency adjusting apparatus comprises a strip with a fastener so as to be fixed to the display device; or wherein the transparency adjusting apparatus is coupled to the display device by a frame.

11. A display device, comprising:
   a display panel;
   a first transparent shell disposed in front of the display panel;
   a heater disposed on the first transparent shell; and
   a second transparent shell disposed on the first transparent shell;
   wherein the first transparent shell and the second transparent shell are sealed to define a sealed space for containing a working fluid therein and the working fluid absorbs heat from the heater and evaporates to condense on the second transparent shell, thereby adjusting the transparency of the second transparent shell.

12. The display device as claimed in claim 11, further comprising:
   a transparency detector comprising a light emitter and a light receiver, the light emitter emitting a light beam passing through the first transparent shell and the second transparent shell and received by light receiver, thereby acquiring data pertinent to the transparency of the first transparent shell and the second transparent shell; and
   a control circuit electrically connected to the light emitter, the light receiver, and the heater, the control circuit receiving the data pertinent to the transparency of the first transparent shell and the second transparent shell and sending the data to the heater, thereby providing feedback control of a saturation pressure and a boiling point of working liquid.

13. The display device as claimed in claim 12, wherein, in response to starting the heater to heat up the sealed space, the saturation pressure and the boiling point of the working liquid rising to allow vapor of the working liquid to condense on the second transparent shell and thereby form a condensed layer and reduce the transparency of the second transparent shell.

14. A transparency adjusting apparatus for a display device or kits thereof, configured as being disposed in front of a display surface of the display device or kits thereof, comprising:
   a first transparent shell body comprising a first transparent shell portion and a second transparent shell portion; and
   a heater disposed on the first transparent shell portion;
   wherein the first transparent shell portion and the second transparent shell portion together define a sealed space for containing a working fluid therein and the working fluid absorbs heat from the heater and evaporates to condense on the second transparent shell portion, thereby adjusting the transparency of the second transparent shell portion.

15. The transparency adjusting apparatus as claimed in claim 14, wherein the first transparent shell body comprises a vapor chamber made of a transparent material; or wherein the working liquid is one selected from the group consisting of water, alcohol, ammonia, and cryogen.

* * * * *